United States Patent
Watanabe et al.

(10) Patent No.: US 10,104,014 B2
(45) Date of Patent: Oct. 16, 2018

(54) DATA TRANSFERRING SYSTEM, DATA TRANSFERRING METHOD, CONTROLLER, CONTROLLING METHOD, AND NON-TRANSITORY COMPUTER READABLE STORAGE MEDIUM

(71) Applicant: YOKOGAWA ELECTRIC CORPORATION, Musashino-shi, Tokyo (JP)

(72) Inventors: Senji Watanabe, Tokyo (JP); Hiroshi Miyata, Tokyo (JP)

(73) Assignee: Yokogawa Electric Corporation, Musashino-shi, Tokyo (JP)

( * ) Notice: Subject to any disclaimer, the term of this patent is extended or adjusted under 35 U.S.C. 154(b) by 123 days.

(21) Appl. No.: 14/814,665

(22) Filed: Jul. 31, 2015

(65) Prior Publication Data
US 2016/0065501 A1 Mar. 3, 2016

(30) Foreign Application Priority Data
Aug. 27, 2014 (JP) .................... 2014-173153

(51) Int. Cl.
*H04W 4/00* (2018.01)
*H04L 12/937* (2013.01)
(Continued)

(52) U.S. Cl.
CPC ............ *H04L 49/254* (2013.01); *H04L 41/08* (2013.01); *H04L 45/021* (2013.01);
(Continued)

(58) Field of Classification Search
CPC .......... H04L 49/254; H04J 3/06; G06F 15/16
(Continued)

(56) References Cited

U.S. PATENT DOCUMENTS

2010/0070062 A1* 3/2010 Fontanot .......... G05B 19/41865
700/100
2013/0283398 A1* 10/2013 Wu .................. G06F 21/60
726/28

(Continued)

FOREIGN PATENT DOCUMENTS

| JP | 2007-074383 A | 3/2007 |
|----|---------------|--------|
| WO | 2014114196 A1 | 7/2014 |

OTHER PUBLICATIONS

Anders Nygren et al., "OpenFlow Switch Specification;" Open Networking Foundation, Version 1.4.0, Oct. 14, 2013; pp. 9-17.

(Continued)

*Primary Examiner* — Iqbal Zaidi
(74) *Attorney, Agent, or Firm* — Sughrue Mion, PLLC

(57) ABSTRACT

A data transferring system includes a switch and a controller. The switch transfers data from a transmission source to a transmission destination with reference to a table in which a first information and a second information are associated. The controller includes a setter configured to set a tentative table to the switch, the tentative table storing the second information for outputting data, which is matched with the condition represented by the first information, to the controller, an obtainer configured to obtain a route information representing a route between the transmission source and the transmission destination, and an updater configured to update the tentative table to a table in which an outputting destination of data, which is matched with the condition represented by the first information, is changed in accordance with the route information.

12 Claims, 8 Drawing Sheets

(51) Int. Cl.
  *H04L 12/755* (2013.01)
  *H04L 12/24* (2006.01)
  *H04L 12/741* (2013.01)

(52) U.S. Cl.
  CPC ...... *H04L 41/0806* (2013.01); *H04L 41/0813* (2013.01); *H04L 45/54* (2013.01)

(58) Field of Classification Search
  USPC .................................................. 370/252–503
  See application file for complete search history.

(56) References Cited

U.S. PATENT DOCUMENTS

2014/0019639 A1* 1/2014 Ueno .................... H04L 61/103
                                                        709/238
2014/0098669 A1   4/2014 Garg et al.

OTHER PUBLICATIONS

Thomas D. Nadeau, Ken Gray, "Software Defined Network: SDN and Open Flow Analysis", May 31, 2014, pp. 219-220 (5 pages total).

* cited by examiner

| ID | PRIORITY | CONDITION (MATCH) | PROCESSING (ACTION) |
|---|---|---|---|
| 1 | 1000 | SADDR=any, DADDR=10.0.0.1<br>PROTOCOL=UDP<br>SPORT=any, DPORT=53 | Output<br>Port=Ctrl |
| 2 | 1000 | SADDR=10.0.0.1, DADDR=any<br>PROTOCOL=UDP<br>SPORT=53, DPORT=any | Output<br>Port=Ctrl |
| ⋮ | ⋮ | ⋮ | ⋮ |

| ID | PRIORITY | CONDITION (MATCH) | PROCESSING (ACTION) |
|---|---|---|---|
| 1 | 1000 | SADDR=any, DADDR=10.0.0.1<br>PROTOCOL=UDP<br>SPORT=any, DPORT=53 | Output<br>Port=Ctrl |
| 2 | 1000 | SADDR=10.0.0.1, DADDR=any<br>PROTOCOL=UDP<br>SPORT=53, DPORT=any | Output<br>Port=Ctrl |
| 3 | 2000 | SADDR=10.0.0.9, DADDR=10.0.0.1<br>PROTOCOL=UDP<br>SPORT=any, DPORT=53 | Output<br>Port=12 |
| 4 | 2000 | SADDR=10.0.0.1, DADDR=10.0.0.9<br>PROTOCOL=UDP<br>SPORT=53, DPORT=any | Output<br>Port=1 |
| ⋮ | ⋮ | ⋮ | ⋮ |

TB2

| ID | PRIORITY | CONDITION (MATCH) | PROCESSING (ACTION) |
|---|---|---|---|
| 1 | 1000 | SADDR=any, DADDR=10.0.0.1<br>PROTOCOL=UDP<br>SPORT=any, DPORT=53 | Output<br>Port=Ctrl |
| 2 | 1000 | SADDR=10.0.0.1, DADDR=any<br>PROTOCOL=UDP<br>SPORT=53, DPORT=any | Output<br>Port=Ctrl |
| 3 | 2000 | SADDR=10.0.0.9, DADDR=10.0.0.1<br>PROTOCOL=UDP<br>SPORT=any, DPORT=53 | Output<br>Port=6 |
| 4 | 2000 | SADDR=10.0.0.1, DADDR=10.0.0.9<br>PROTOCOL=UDP<br>SPORT=53, DPORT=any | Output<br>Port=7 |
| ⋮ | ⋮ | ⋮ | ⋮ |

DATA TRANSFERRING SYSTEM, DATA TRANSFERRING METHOD, CONTROLLER, CONTROLLING METHOD, AND NON-TRANSITORY COMPUTER READABLE STORAGE MEDIUM

BACKGROUND OF THE INVENTION

Field of the Invention

The disclosure relates to a data transferring system, a data transferring method, a controller, a controlling method, and a non-transitory computer readable storage medium.

Priority is claimed on Japanese Patent Application No. 2014-173153, filed Aug. 27, 2014, the contents of which are incorporated herein by reference.

Description of Related Art

Generally, a network device configuring a network (for example, a switch) has an access control list (ACL), and the network device performs a data transferring control with reference to the access control list. In the access control list, regardless of a specific configuration of the network, abstract contents (for example, an address of a transmission destination, a port number of software, and so on) can be set. For example, these abstract contents can be set by a command "iptables" of Linux (registered trademark).

Recently, a technology called as Open Flow is used. The Open Flow is a technology which is developed based on a concept of "Software-Defined Network" which means that a network is controlled by programming. The Open Flow is a technology for separating a network device configuring a network into a route controller (OFC: Open Flow Controller) and a data transferring device (OFS: Open Flow Switch), and the route controller performs a transferring control by collectively managing a flow table stored in the data transferring device.

The flow table, which is used in the Open Flow, can be described the access control list. The flow table is a table which stores information related to a condition for performing the transferring control (Match) and a processing which should be performed when the condition is satisfied (Action). In Japanese Unexamined Patent Application Publication No. 2007-74383, an example of a conventional technology, which performs the transfer control with reference to the access control list, is disclosed.

By the way, in an environment called as critical infrastructure such as a plant, so as to ensure security, there is a request to strictly control communications performed via a network. For example, a control based on a white list is requested. In the control based on the white list, all communications are basically rejected, and only a communication of a particular application which is explicitly specified is allowed.

As described above, the network device (hereinafter, "conventional network device"), which performs the transferring control by using the access control list, can set the abstract contents such as an address of transmission destination to the access control list. Therefore, even if a network manager does not understand a specific configuration of the network, the transferring control can be strictly performed by creating the access control list as the white list.

However, in the conventional network device, a setting of the access control list must be performed by using a command which depends on a vendor and a type of the network device. Therefore, in a network where various types of network devices supplied by various vendors are mixed, the access control list must be set by using a command suitable for a network device which is a setting target. For the reason, there is a problem that a complicated management is needed and it is difficult to perform a strict transferring control timely.

On the other hand, a network device, which is in conformity with a specification of the Open Flow described above, can set a flow table by using a uniform protocol. Therefore, because there is no need to use the command which depends on a type of the network device and the management is simplified, even if it is a network where various types of network devices supplied by various vendors are mixed, it is thought that the strict transferring control can be performed timely.

However, the flow table must be described in accordance with a specific configuration of the network. For example, in a case that a processing which should be performed when the condition of the transferring control is satisfied (Action) is a transmission (output) of data, there is a need to describe a physical port of a data transferring device, which outputs the data, in the flow table. Therefore, in a case that the network manager does not preliminarily understand the specific configuration (specific connection state) of the network, there is a problem that the flow table cannot be created.

In addition, in a case that a network device, which is in conformity with the specification of the Open Flow, is installed in the network configured by the conventional network device, it is thought that the conventional network device and the network device which is in conformity with the specification of the Open Flow are mixed. In this situation, because a different management with respect to the each network device is needed, there is a problem that the management is further complicated.

SUMMARY

A data transferring system may include a switch and a controller. The switch may transfer data from a transmission source to a transmission destination with reference to a table in which a first information and a second information are associated. The controller may include a setter configured to set a tentative table to the switch, the tentative table storing the second information for outputting data, which is matched with the condition represented by the first information, to the controller, an obtainer configured to obtain a route information representing a route between the transmission source and the transmission destination, and an updater configured to update the tentative table to a table in which an outputting destination of data, which is matched with the condition represented by the first information, is changed in accordance with the route information.

Further features and aspects of the present disclosure will become apparent from the following detailed description of exemplary embodiments with reference to the attached drawings.

BRIEF DESCRIPTION OF THE DRAWINGS

FIG. 2 is a drawing illustrating an example of the tentative flow table used in the first embodiment.

FIG. 3 is a drawing illustrating an example of the flow table used in the first embodiment.

DETAILED DESCRIPTION OF THE EMBODIMENTS

The embodiments of the present invention will be now described herein with reference to illustrative preferred embodiments. Those skilled in the art will recognize that many alternative preferred embodiments can be accomplished using the teaching of the present invention and that the present invention is not limited to the preferred embodiments illustrated herein for explanatory purposes.

An aspect of some embodiments of the present invention is to provide a data transferring system, a data transferring method, a controller, a controlling method, and a non-transitory computer readable storage medium which can perform a strict transferring control timely, even if a network manager does not understand a specific configuration of a network, or even if a specific configuration device is exchanged during operation.

The data transferring system, the data transferring method, the controller, the controlling method, and the non-transitory computer readable storage medium of the present embodiment will be described in detail below with reference to drawings.

First Embodiment

Figure 1:
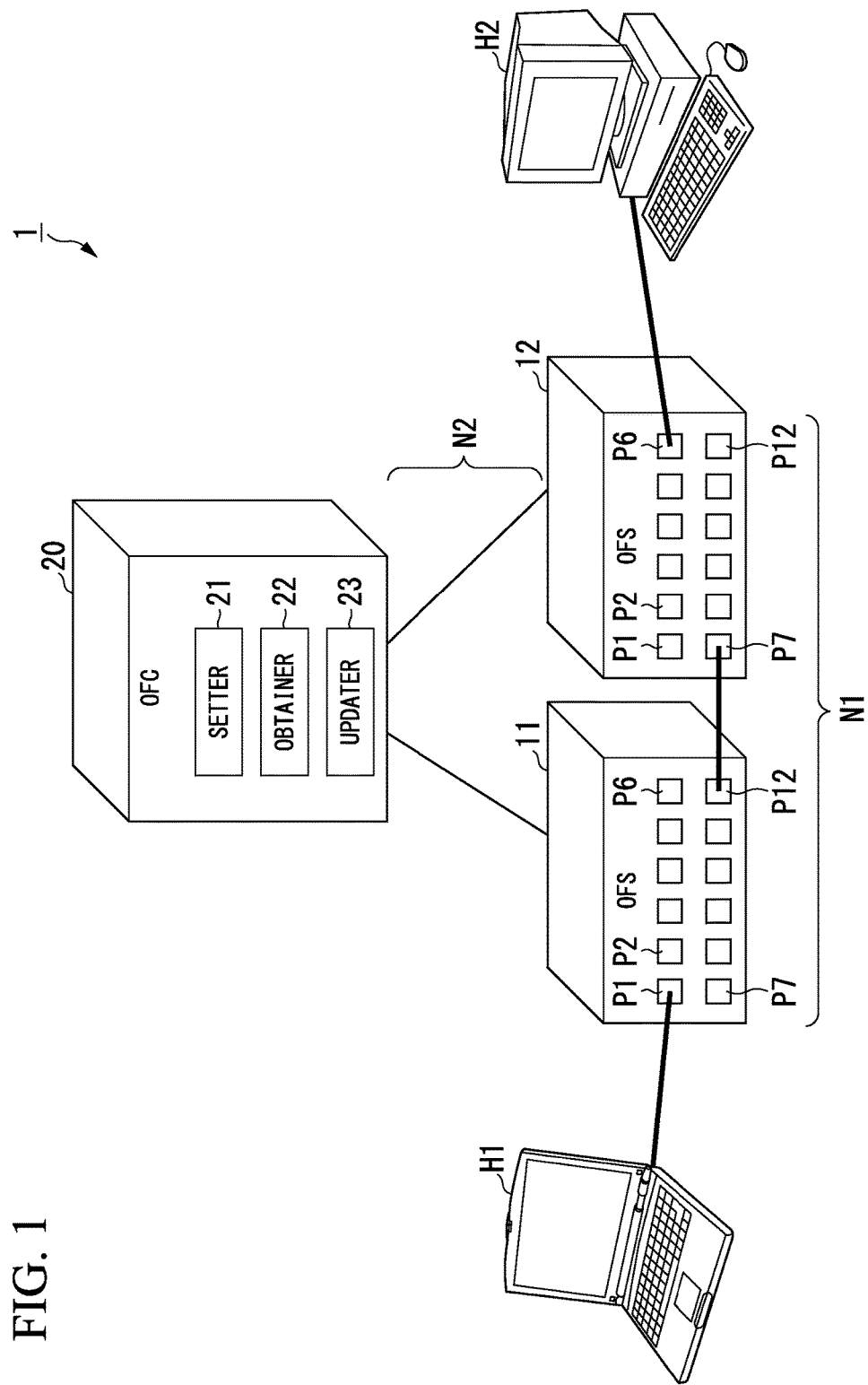
FIG. 1 is a block diagram illustrating a main configuration of the data transferring system in a first embodiment.

FIG. 1 is a block diagram illustrating a main configuration of the data transferring system in a first embodiment. As shown in FIG. 1, the data transferring system 1 in the present embodiment is equipped with an OFS (Open Flow Switch: switch) 11, an OFS 12, and an OFC (Open Flow Controller: controller) 20. The OFC 20 has a setter 21, an obtainer 22, and an updater 23. Under a control of the OFC 20, the OFS 11 and the OFS 12 transfer data, which is transmitted from a transmission source, to a transmission destination. So as to understand easily, although the data transferring system 1 which is equipped with the two OFS 11 and 12 is shown in FIG. 1, a number of the OFS which is provided in the data transferring system 1 is arbitrary.

So as to understand easily, a host H1 is a transmission source of data, and a host H2 is a transmission destination of data. The host H1 is a DNS (Domain Name System) client allocated an IP (Internet Protocol) address which is "10.0.0.9". The host H2 is a DNS (Domain Name System) server allocated an IP address which is "10.0.0.1". For example, these hosts H1 and H2 are implemented by a notebook-type computer, a desktop-type computer, a tablet-type computer, or other computers.

The OFS 11 and the OFS 12 has a plurality of physical ports P1 to P12. The OFS 11 and the OFS 12 perform a transferring processing of received data under the control of the OFC 20. Specifically, the OFS 11 and the OFS 12 stores flow tables TB1 and TB2 (table: referring to FIG. 2 and FIG. 3) into a memory (not shown). The OFS 11 and the OFS 12 transfer data by using a transferer (not shown) with reference to the flow tables TB1 and TB2. Details of the flow tables TB1 and TB2 will be described later.

As shown in FIG. 1, the physical port P1 of the OFS 11 is connected to the host H1, the physical port P6 of the OFS 12 is connected to the host H2, and the physical port P12 of the OFS 11 and the physical port P7 of the OFS 12 are connected with each other. Thereby, a network N1 for transferring data is established. Between the host H1 and the host H2, the OFS 11 and the OFS 12 are connected to the OFC 20 via control ports (not shown) which is different from the physical ports P1 to P12. Thereby, a network N2 for the Open Flow Control is established. A number of the physical ports provided in the OFS 11 and OFS 12 is arbitrary.

The OFC 20 performs a data transferring control for transferring data which is transferred via the network N1 by collectively managing the flow tables TB1 and TB2 used by the OFS 11 and the OFS 12. Specifically, in a case that a route between the host H1 and the host H2 is unknown, the setter 21 of the OFC 20 sets a tentative flow table TB0 stored in the memory (tentative flow table: referring to FIG. 2) to the OFS 11 and the OFS 12 as the flow table TB1 and the TB2 respectively, and the OFC 20 performs the data transferring control by using a controller (not shown). In a case that the obtainer 22 of the OFC 20 obtains a route information representing the route between the hosts H1 and H2, the updater 23 of the OFC 20 updates the tentative flow table TB0 to the flow tables TB1 and TB2 (shown in FIG. 3) and performs the data transferring control. In this way, the OFC 20 sets and updates the tentative flow table TB0, so that the OFC 20 can timely perform a strict transferring control based on a white list even if a network manager does not preliminarily understand a specific configuration of the network N1.

Next, the flow tables managed by the OFC 20 will be described. FIG. 2 is a drawing illustrating an example of the tentative flow table used in the first embodiment. FIG. 3 is a drawing illustrating an example of the flow table used in the first embodiment. As shown in FIG. 2 and FIG. 3, in the tentative flow table TB0 and the flow tables TB1 and TB2, a field where a priority is stored, a field where a condition for performing the transferring control (Match: first information) is stored, and a field where a processing which should be performed when the condition is satisfied (Action: second information) is stored, are provided. The priority is used for setting a priority of an entry. An entry where a high priority is stored is prioritized.

In the tentative flow table TB0 shown in FIG. 2 as an example, two entries of which priority is "1000" are set. In the entry of which ID is "1", information described below is stored as the condition and the processing.

[Condition]
transmission source address (SADDR)="any (arbitrary)"
transmission destination address (DADDR)="10.0.0.1"
protocol (PROTOCOL)="UDP (User Datagram Protocol)"
port number of transmission source (SPORT)="any"
port number of transmission destination (DPORT)="53 (port number used by DNS)"
[Processing]
output
physical port (Port)="Ctrl"

In the entry of which ID is "2", information described below is stored as the condition and the processing.
[Condition]
transmission source address (SADDR)="10.0.0.1"
transmission destination address (DADDR)="any"

protocol (PROTOCOL)="UDP"
port number of transmission source (SPORT)="53"
port number of transmission destination (DPORT)="any"
[Processing]
output
physical port (Port)="Ctrl"

Specifically, in the entry of which ID is "1", information representing "UDP data (datagram) of which transmission destination is a port 53 in the host H2" is stored as the condition, and information representing "outputting to the control port (Ctrl) (not shown)" is stored as the processing. In the entry of which ID is "2", information representing "UDP data (datagram) of which transmission source is a port 53 in the host H2" is stored as the condition, and information representing "outputting to the control port (Ctrl) (not shown)" is stored as the processing. That is, in the tentative table TB0, information representing an instruction of outputting data, which is matched with the condition, to the OFC 20 which is connected to the control ports (not shown) disposed in the OFS 11 and the OFS 12 is stored.

In the flow tables TB1 and TB2 shown in FIG. 3 as an example, two entries of which priorities are "1000" and two entries of which priorities are "2000" are set respectively. In the two entry of which priorities are "1000" (the entry of which ID is "1" and the entry of which ID is "2") in the flow tables TB1 and TB2, information which is the same as the information of the two entries in the tentative flow table TB0 (the entry of which ID is "1" and the entry of which ID is "2") is stored respectively.

In one of the entries of which priority is "2000" (the entry of which ID is "3") in the flow table TB1, information described below is stored as the condition and the processing.
[Condition]
transmission source address (SADDR)="10.0.0.9"
transmission destination address (DADDR)="10.0.0.1"
protocol (PROTOCOL)="LJDP"
port number of transmission source (SPORT)="any"
port number of transmission destination (DPORT)="53"
[Processing]
output
physical port (Port)="12"

In another entry of which priority is "2000" (the entry of which ID is "4") in the flow table TB1, information described below is stored as the condition and the processing.
[Condition]
transmission source address (SADDR)="10.0.0.1"
transmission destination address (DADDR)="10.0.0.9"
protocol (PROTOCOL)="UDP"
port number of transmission source (SPORT)="53"
port number of transmission destination (DPORT)="any"
[Processing]
output
physical port (Port)="1"

Specifically, in the flow table TB1, in the entry of which ID is "3", information representing "UDP data (datagram) of which transmission source is the host H1 and of which transmission destination is a port 53 in the host H2" is stored as the condition, and information representing "outputting to the physical port P12" is stored as the processing. In the flow table TB1, in the entry of which ID is "4", information representing "UDP data (datagram) of which transmission source is a port 53 in the host H2 and of which transmission destination is the host H1" is stored as the condition, and information representing "outputting to the physical port 1" is stored as the processing. That is, in the table TB1, out of the physical ports P1 to P12 disposed in the OFS 11, information of a physical port to which data should be output along an actual route between the hosts H1 and H2, is stored.

As with the flow table TB1, in the flow table TB2, in the entry of which ID is "3", information representing "UDP data (datagram) of which transmission source is the host H1 and of which transmission destination is a port 53 in the host H2" is stored as the condition, and information representing "outputting to the physical port P6" is stored as the processing. In the flow table TB1, in the entry of which ID is "4", information representing "UDP data (datagram) of which transmission source is a port 53 in the host H2 and of which transmission destination is the host H1" is stored as the condition, and information representing "outputting to the physical port 7" is stored as the processing. That is, in the table TB2, out of the physical ports P1 to P12 disposed in the OFS 12, information of a physical port to which data should be output along an actual route between the hosts H1 and H2, is stored.

In the flow tables TB1 and TB2 shown in FIG. 3 as an example, the two entries of which priority is "2000" (the entry of which ID is "3" and the entry of which ID is "4") are given priority over the two entries of which priority is "1000" (the entry of which ID is "1" and the entry of which ID is "2"). Therefore, in a case that the flow tables TB1 and TB2 shown in FIG. 3 are used, a data transferring processing is performed along the actual route between the hosts H1 and H2.

Figure 4:
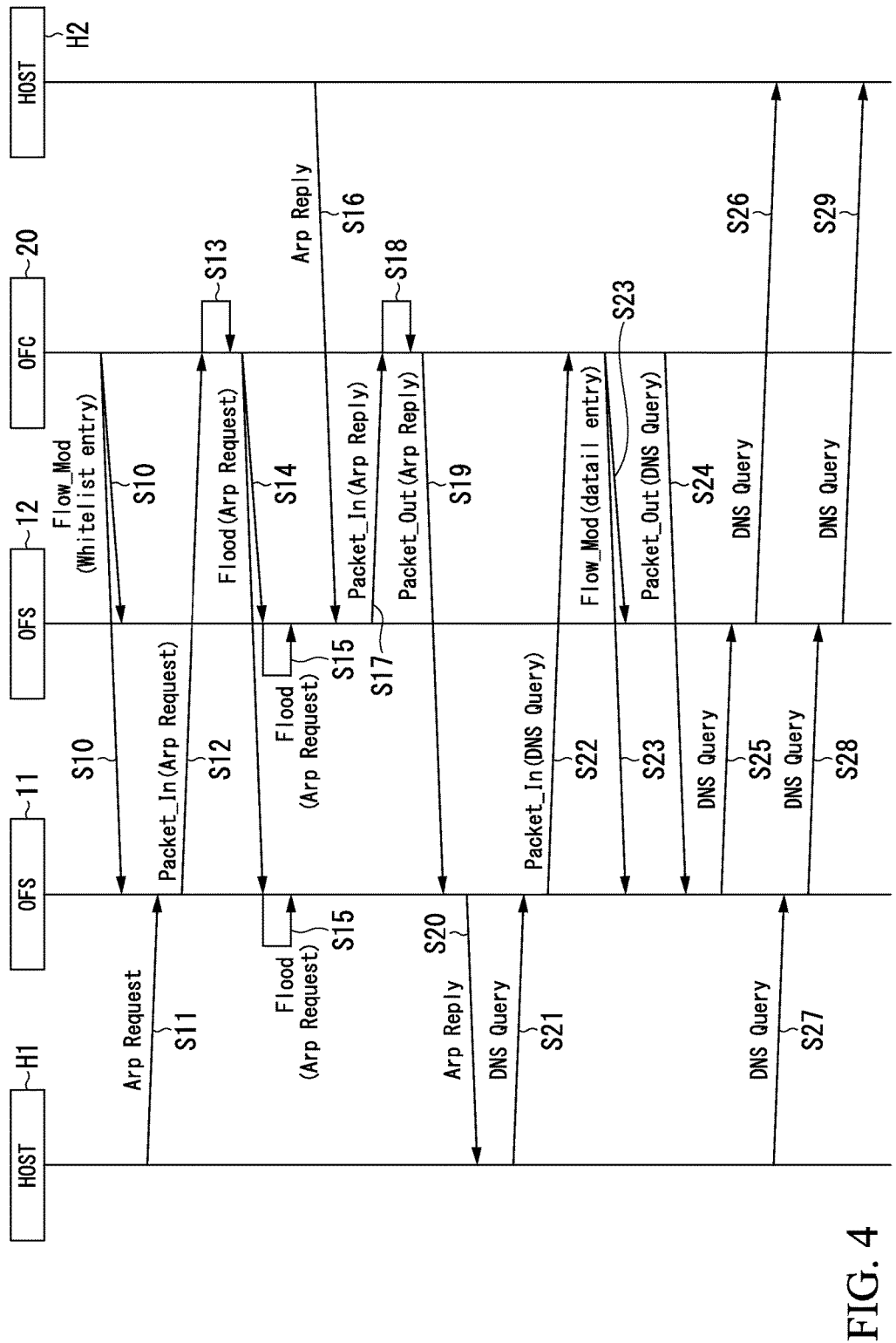
FIG. 4 is a timing chart illustrating an example of operations of the data transferring system 1 in the first embodiment.

Next, operations of the data transferring system 1 having the configuration will be described. FIG. 4 is a timing chart illustrating an example of operations of the data transferring system 1 in the first embodiment. For example, the processing shown in FIG. 4 is started when the network N1 is newly established, when the network N1 is changed, when the network manager instructs, or the like.

When the processing is started, first, the OFC 20 transmits a message (Flow_Mod message) to the OFS 11 and the OFS 12 via the network N2, and the OFC 20 registers the white list which is a condition for allowing a communication via the network N1 (step S10). Specifically, the OFC 20 sets the tentative flow table TB0 (a table where information for outputting data, which is matched with the condition, to the OFC 20 is stored) shown in FIG. 2 to the OFS 11 and the OFS 12 as the flow tables TB1 and TB2 respectively.

After the processing is completed, so as to obtain a MAC (Media Access Control) address of the host H2 which is the DNS server, the host H1 which is the DNS client broadcasts an Arp (Address Resolution Protocol) request (step S11). After the Arp request broadcasted by the host H1 is received by the OFS 11, the Arp request is output to the control port (Ctrl) (not shown) in accordance with a predetermined rule, and the Arp request is transmitted to the OFC 20 as a message (Packet_In message) via the network N2 (step S12).

Information for identifying the OFS and a port connected to the host H1, which broadcasted the Arp request, is included in the message (Packet_In message) transmitted from the OFS 11. Therefore, the OFC 20 stores information representing a connection position of the host H1 (information representing that the host H1 is connected to the physical port P1 in the OFS 11) (step S13).

After the OFC 20 receives the message (Packet_In message) transmitted from the OFS 11, the OFC 20 transmits a message (a Flood message for broadcasting the Arp request) to the OFS 11 and the OFS 12 via the network N2 (step S14). This processing is performed because it is unknown which of the OFS 11 and the OFS 12 is connected to the host H2 which is a transmission destination of the Arp request. Thereby, the OFS 11 and the OFS 12 broadcasts the Arp request from all physical ports of which connection relation is unknown (the physical ports P2 to P11 in the OFS 11 and the physical ports P1 to P6 and P8 to P12 in the OFS 12) (step S15).

After the processing, the Arp request transmitted from the host H1 is received by the host H2 connected to the physical port P6 in the OFS 12. Thereby, the host H2 transmits an Arp reply to the OFS 12 as a reply for the Arp request (step S16). After the OFS 12 receives the Arp reply transmitted from the host H2, the OFS 12 transmits the message (Packet_In message) to the OFC 20 via the network N2 (step S17).

Information for identifying the OFS and a port connected to the host H2, which transmitted the Arp reply, is included in the message (Packet_In message) transmitted from the OFS 12. Therefore, the OFC 20 stores information representing a connection position of the host H2 (information representing that the host H2 is connected to the physical port P6 in the OFS 12) (step S18).

After the OFC 20 receives the message (Packet_In message) transmitted from the OFS 12, the OFC 20 transmits a message (Packet_Out message) to the OFS 11 via the network N2 (step S19). This processing is performed because it is known that the host H1 which is a transmission destination of the Arp reply is connected to the physical port P1 in the OFS 11 which is a transmission destination of the Arp request.

After the OFS 11 receives the message (Packet_Out message) transmitted from the OFC 20, the OFS 11 outputs the Arp reply from the physical port P1 (step S20). Thereby, the Arp reply transmitted from the host H2 can be received by the host H1 connected to the physical port P1 in the OFS 11, and the MAC address of the host H2, as the DNS server, can be obtained in the host H1.

After the processing is completed, the host H1, as the DNS client, transmits a data packet (DNS query) to the host H2, as the DNS server (step S21). This processing is performed so that, for example, the host H1 requests an IP address of another host (not shown) connected to the network N1.

After the OFS 11 receives the DNS query transmitted from the host H1, the OFS 11 performs a transferring processing with reference to the flow table TB1 (the tentative flow table TB0 shown in FIG. 2). The DNS query transmitted from the host H1 is "UDP data (datagram) of which transmission destination is the port 53 in the host H2", and it is matched with the condition stored in the entry of which ID is "1" in the tentative flow table TB0 shown in FIG. 2. Therefore, the OFS 11 outputs the DNS query transmitted from the host H1, as a message (Packet_In message), from the control port (not shown) in accordance with the processing stored in the entry of which ID is "1" in the tentative flow table TB0 shown in FIG. 2.

The message (Packet_In message) output from the control port (not shown) in the OFS 11 is transmitted to the OFC 20 via the network N2 (step S22). After the OFC 20 receives the message (Packet_In message) from the OFS 11, the OFC 20 performs a processing for finding a route from the host H1 to the host H2. This processing is performed because the OFC 20 obtains the connection positions of the hosts H1 and H2 by performing the steps S13 and S18 but does not obtain a route between the connection points.

After the OFC 20 finds the route from the host H1 to the host H2, the OFC 20 transmits a message (Flow_Mod message) to the OFS 11 and the OFS 12 via the network N2. Thereafter, the OFC 20 registers the flow table which is reflected the route from the host H1 to the host H2 (step S23). Specifically, the OFC 20 respectively updates the tentative flow table TB0 (shown in FIG. 2), which is set to the OFS 11 and the OFS 12 as the flow tables TB1 and TB2, to the flow tables TB1 and TB2 shown in FIG. 3 where the entries of which ID is "3" are added.

The newly added entries in the flow tables TB1 and TB2 shown in FIG. 3 (the entries of which ID is "3") are higher in the priority than the former entries (the entries of which ID is "1" or "2"). Therefore, after the OFC 20 updates the tentative flow table TB0, the OFS 11 and the OFS 12 are to perform a data transferring processing of the newly added entries in the flow tables TB1 and TB2 (the entries of which ID is "3") with priority.

After the OFC 20 receives the message (Packet_In message) transmitted from the OFS 11, the OFC 20 transmits a message (Packet_Out message) to the OFS 11 via the network N2 (step S24). Because the tentative flow table TB0 is updated to the flow tables TB1 and TB2 which are reflected the route from the host H1 to the host H2, the processing is performed so that the DNS query can be transmitted from the host H1 to the host H2.

After the OFS 11 receives the message (Packet_Out message) transmitted from the OFC 20, the OFS 11 performs a transferring processing with reference to the flow table TB1. The DNS query included in the message transmitted from the OFC 20 is "UDP data (datagram) of which transmission source is the host H1 and of which transmission destination is the port 53 in the host H2", and it is matched with the condition stored in the entry of which ID is "3" in the flow table TB1 shown in FIG. 3. Therefore, the OFS 11 outputs the DNS query to the physical port P12 in accordance with the processing stored in the entry of which ID is "3" in the flow table TB1 shown in FIG. 3 (step S25).

The DNS query output from the OFS 11 is input to the physical port P7 in the OFS 12, and the DNS query is received by the OFS 12. After the OFS 12 receives the DNS query transmitted from the OFS 11, the OFS 12 performs a transferring processing with reference to the flow table TB2. The DNS query included in the message transmitted from the OFS 12 is matched with the condition stored in the entry of which ID is "3" in the flow table TB2 shown in FIG. 3. Therefore, the OFS 11 outputs the DNS query to the physical port P6 in accordance with the processing stored in the entry of which ID is "3" in the flow table TB2 shown in FIG. 3 (step S26). Thereby, the DNS query transmitted from the host H1 is received by the host H2 which is connected to the physical port P6 in the OFS 12.

By the processing of the step S23, the flow tables TB1 and TB2, which are reflected the route from the host H1 to the host H2, are respectively set to the OFS 11 and the OFS 12. Therefore, after the host H1 transmits the DNS query, the OFS 11 and the OFS 12 perform a transferring processing with reference to the flow tables TB1 and TB2 without transmitting a message to the OFC 20. Thereby, the DNS query, which is transmitted from the host H1, is transferred to the host H2 via the network N1 (steps S27 to S29).

Although illustration is omitted in FIG. 4, in a case that the host H2 receives the DNS query from the host H1, the host H2 transmits the DNS response to the host H1. When the DNS response is transmitted, processing which is the same as the steps S11 to S26 shown in FIG. 4 is performed. However, it is necessary that the host H1 and the host H2 shown in FIG. 4 are exchanged, the OFS 11 and the OFS 12 are exchanged, and "DNS query" in FIG. 4 is replaced by "DNS response". In a case that the host H2 obtains the MAC address of the host H1 when the host H2 receives the Arp request transmitted from the host H1, the processing corresponding to the steps S11 to S20 can be omitted.

By performing the processing corresponding to the step S23 shown in FIG. 4 when the DNS response is transmitted from the host H2, entries of which ID is "4" shown in FIG. 3 are added to the flow tables TB1 and TB2 which are set to the OFS 11 and the OFS 12 respectively. Thereby, the OFS 12 outputs the DNS response, which is transmitted from the host H2, to the physical port P7 in accordance with the flow table TB2. On the other hand, the OFS 11 outputs the DNS response, which is transmitted from the OFS 12, to the physical port P1 in accordance with the flow table TB1. In this way, the DNS response is transferred from the host H2 to the host H1 via the network N1.

When the hosts H1 and H2 are removed from the network N1, information representing that the hosts H1 and H2 are removed from the network N1 is transmitted from the OFS 11 and the OFS 12 to the OFC 20 via the network N2. In a case that the OFC 20 receives the information, the OFC 20 transmits a control signal to the OFS 11 and the OFS 12 via the network N2. This control signal is a signal for deleting information relating to the hosts H1 and H2 which are removed from the network N1.

As described above, in the present embodiment, in a case that the route between the hosts H1 and H2 is unknown, the OFC 20 sets the tentative flow table TB0 to the OFS 11 and the OFS 12. Also, in a case that route information representing the route between the hosts H1 and H2 is obtained, the OFC 20 updates the tentative flow table TB0 to the tables TB1 and TB2 of which contents are updated based on the route information, and the OFC 20 performs the data transferring control. The tentative flow table TB0 is a flow table in which the condition with respect to received data and the processing for outputting data, which is matched with the condition, to the OFC 20 are described. Therefore, in the present embodiment, a strict transferring control based on a white list can be performed timely, even if the network manager does not preliminarily understand a specific configuration of the network N1.

It is also considered that the OFS 11 and the OFS 12 requests a processing rule for data, which is not matched with the condition, to the OFC 20. However, in the method, in a case that a malicious person transmits a lot of data which is not matched with the condition, there is a possibility that failure of the data transferring system 1 occurs. In the present embodiment, the condition with respect to received data and the processing for outputting data, which is matched with the condition, to the OFC 20 are described in the tentative flow table TB0. For the reason, the occurrence of the failure can be prevented, and security can be improved.

In the present embodiment described above, the updater 23 updates the tentative flow table TB0 at a timing when the host H1 transmits the DNS query to the host H2 (referring to the step S23). However, the timing when the tentative flow table TB0 is updated may be a timing when the route information representing the route (which may be a part of the route) between the hosts H1 and H2 is obtained, or a timing when the host H1 transmits any data to the host H2 for the first time after the route information is obtained.

For example, in an example shown in FIG. 4, if the steps S11 to S18 are performed, the route information representing the route between the hosts H1 and H2 can be obtained. Therefore, at the timing when the step S18 is completed, the OFC 20 may obtain the route information representing the route between the hosts H1 and H2, and the OFC 20 may perform a processing (processing of the step S23) for updating the tentative flow table TB0. In FIG. 4, although an example in which the data transmission and reception between the hosts H1 and H2 is performed by unicast is shown, the data transmission and reception between the hosts H1 and H2 may be performed by multicast. However, because the Arp cannot be transmitted, there is a need to know connection ports of the hosts H1 and H2 by using a message such as an IGRP (Interior Gateway Routing Protocol).

In the present embodiment described above, after the processing (processing of the step S23) for updating the tentative flow table TB0 is performed, the message (Packet_Out message) is transmitted from the OFC 20 to the OFS 11 (step S24), the DNS query is transferred from the host H1 to the host H2 by the transferring processing of the OFS 11 and the OFS 12. However, the message (Packet_Out message) may be transmitted to the OFS 12 instead of the OFS 11, and the DNS query may be transferred from the host H1 to the host H2 by the transferring processing of only the OFS 12. Thereby, the transferring processing of the OFS 11 can be omitted, and time required for data transmission can be shortened.

Otherwise, in a case that the OFS 11 has a memory which temporarily stores data transmitted from the host H1, when the DNS query transmitted from the host H1 is received, the received DNS query may be temporarily stored in the memory, and information representing that the DNS query is stored in the memory may be transmitted to the OFC 20 in the step S22. In this case, after the tentative flow table TB0 is updated (step S23), in accordance with an instruction from the OFC 20, the OFS 11 may transfer the DNS query, which is temporarily stored in the memory, with reference to the flow table TB1.

Next, an example, in which the data transferring system 1 described above is applied to a process control system established in a plant, will be described. The plant includes an industrial plant such as a chemical plant, a plant managing and controlling a wellhead (for example, a gas field and an oil field), a plant managing and controlling a generation of electric power (for example, water power, fire power, and nuclear power), a plant managing and controlling a power harvesting (for example, solar power and wind power), a plant managing and controlling water supply and sewerage systems, a dam, and so on.

Figure 5A:
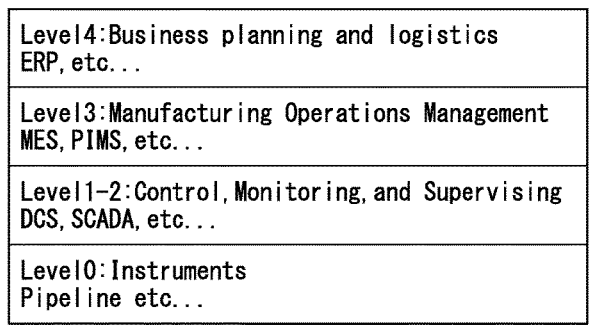
FIG. 5A is a drawing for describing a hierarchical structure of the process control system.
Figure 5B:
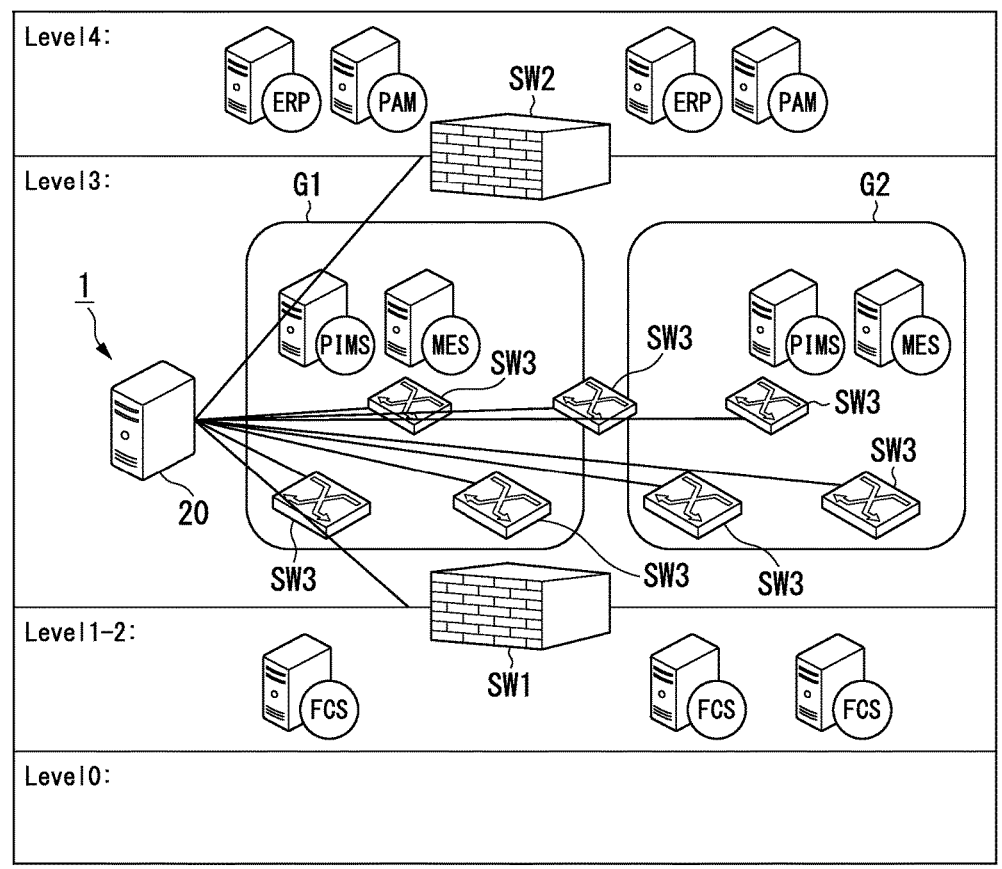
FIG. 5B is a drawing illustrating an exemplary process control system to which the data transferring system is applied.

FIG. 5A and FIG. 5B are drawings illustrating a process control system to which the data transferring system in the first embodiment is applied. FIG. 5A is a drawing for describing a hierarchical structure of the process control system. FIG. 5B is a drawing illustrating an exemplary process control system to which the data transferring system is applied. As shown in FIG. 5A, the process control system established in the plant has the hierarchical structure including a plurality of hierarchies (hierarchies of levels 0 to 4). For example, the hierarchical structure is specified by the international standard IEC/ISO 62264.

The hierarchy of level 4 is a hierarchy in which operations such as a corporate management and a sales business are conducted. In the hierarchy of level 4, an integrated device management system called as an ERP (Enterprise Resource Planning) or a PAM (Plant Asset Management) is established. On the other hand, the hierarchies of levels 0 to 3 are hierarchies called as an ICS (Industrial Control System). The hierarchy of level 3 is a hierarchy in which manufacture of products is conducted. In the hierarchies of levels 0 to 3, a control relating to products is conducted. However, because there is a case that a dangerous object is handled, a high security is required.

Specifically, in the hierarchy of level 3, an MES (Manufacturing Execution System), a PIMS (Plant Information Management System), and so on are established. In the hierarchies of levels 1 and 2, a DCS (Distributed Control System), which is equipped with field devices disposed in the plant and an FCS (Field Control Station) for controlling these field devices, is established.

As described above, because a high security is required in the hierarchies of levels 0 to 3, networks established in the hierarchies of levels 0 to 3 are basically separated from a network established in the hierarchy of level 4. In terms of protecting traffic of communication for control, networks established in the hierarchies of levels 1 and 2 are basically separated from a network established in the hierarchy of level 3.

As shown in FIG. 5B, for example, the data transferring system 1 is applied to the hierarchy of level 3, the OFS 11 is used as a switch SW1 disposed between the hierarchy of level 2 and the hierarchy of level 3, and the OFS 12 is used as a switch SW2 disposed between the hierarchy of level 3 and the hierarchy of level 4. The OFS 11 and the OFS 12 included in the data transferring system 1 can be also used as a switch SW3 included in a network established in the hierarchy of level 3. In the example shown in FIG. 5B, the network established in the hierarchy of level 3 is logically divided into two communication groups G1 and G2.

As shown in FIG. 5B, by applying the data transferring system 1 to the process control system, in the network established in the hierarchy of level 3, a strict transferring control based on a white list can be performed timely. Thereby, not only data communicated between the hierarchies of the other levels (level 2 and level 4) can be managed strictly, but also data communicated in the same hierarchy of level 3 can be managed strictly. The management can be conducted even if the switches SW1 to SW3 are provided by different vendors respectively (or even if types of the switches SW1 to SW3 are different from each other), and even if the network manager does not understand a specific configuration of the network established in the hierarchy of level 3.

Second Embodiment

Figure 6:
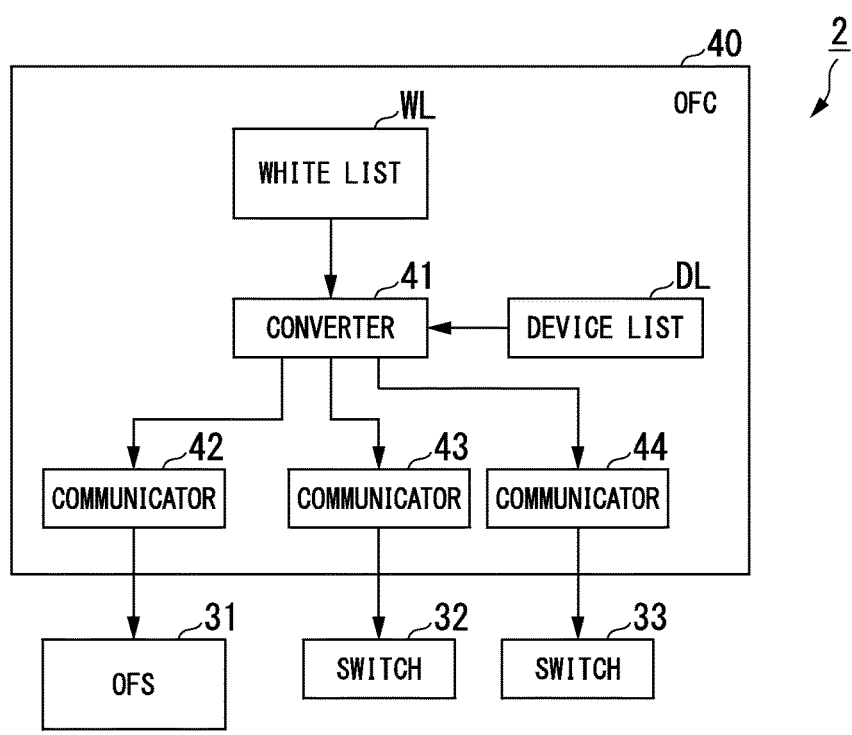
FIG. 6 is a block diagram illustrating a main configuration of the data transferring system in a second embodiment.

FIG. 6 is a block diagram illustrating a main configuration of the data transferring system in a second embodiment. As shown in FIG. 6, the data transferring system 2 in the present embodiment is equipped with an OFS 31 which is in conformity with the specification of the Open Flow, switches 32 and 33 which are not in conformity with the specification of the Open Flow, and an OFC 40. Under a control of the OFC 40, the OFS 31 and the switches 32 and 33 transfer data, which is transmitted from a transmission source, to a transmission destination.

In other words, in the data transferring system 2 in the present embodiment, the OFS 31 which is in conformity with the specification of the Open Flow and switches 32 and 33 which are not in conformity with the specification of the Open Flow are mixed. The OFC 40 collectively controls the OFS 31 and the switches 32 and 33. So as to understand easily, although the data transferring system 2 which is equipped with the OFS 31, which is in conformity with the specification of the Open Flow, and the switches 32 and 33, which are not in conformity with the specification of the Open Flow, is shown in FIG. 6, a number of the OFS and the switches which are provided in the data transferring system 2 is arbitrary.

The OFS 31 is the same as the OFS 11 and OFS 12 shown in FIG. 1. The OFS 31 performs a data transferring control with reference to a flow table (a flow table which is the same as the flow tables TB1 and TB2 shown in FIG. 2 and FIG. 3) managed by the OFC 40. The switches 32 and 33 have an access control list (ACL) (not shown) respectively. The switches 32 and 33 perform a data transferring control with reference to the access control list. The switch 32 is a switch for a Netconf (Network Configuration Protocol), and the switch 32 sets an access control list by communicating in conformity with the Netconf. The switch 33 is a switch for an SNMP (Simple Network Management Protocol), and the switch 32 sets an access control list by communicating in conformity with the SNMP.

As with the OFC 20 shown in FIG. 1, the OFC 40 performs a transferring control of data which is transferred via a network (a network (not shown) including the OFS 31, the switches 32 and 33, and so on) by managing the flow table used by the OFS 31. However, the OFC 40 is different from the OFC 20 shown in FIG. 1 in that the OFC 40 manages the access control lists used by the switches 32 and 33 in addition to the flow table used by the OFS 31.

As shown in FIG. 6, the OFC 40 has a converter 41 (generator) and communicators 42 to 44. The OFC 40 generates a white list WL (a condition list) which is to be stored in a memory (not shown), the flow table which is used based on a device list DL by the OFS 31 (a flow table which is the same as the tentative flow table TB0 shown in FIG. 2), and the access control list which is used by the switches 32 and 33. The OFC40 sets the generated flow table and the access control list to the OFS 31 and the switches 32 and 33 respectively.

The white list WL is a list for specifying conditions of a data transferring control via a network. For example, as the flow tables TB1 and TB2 shown in FIG. 2 and FIG. 3, regardless of a specific configuration of the network, abstract contents (for example, an address of a transmission source, an address of a transmission destination, a port number of the transmission source, a port number of the transmission destination, and so on) are specified in the white list WL. The device list DL is a list in which identification information for identifying a device, information representing whether a device is in conformity with the Open Flow or not, and information representing a protocol used by a device are associated with respect to each device connected to the network. For example, the white list WL and the device list DL are created by the network manager.

The converter 41 reads the white list WL and the device list DL out of the memory. The converter 41 generates the flow table suitable for the OFS 31 and the access control lists suitable for the switches 32 and 33 respectively in accordance with the white list WL and the device list DL. Specifically, the converter 41 generates the tentative flow table TB0 shown in FIG. 2 for the OFS 31. In the tentative flow table TB0, contents of the white list WL are specified as the condition, and information for outputting data to the OFC 40 in a case of being matched with the condition is specified as the processing. The converter 41 creates an access control list which is in conformity with the Nefconf and an access control list which is in conformity with the SNMP for the switches 32 and 33 respectively.

Figure 7:
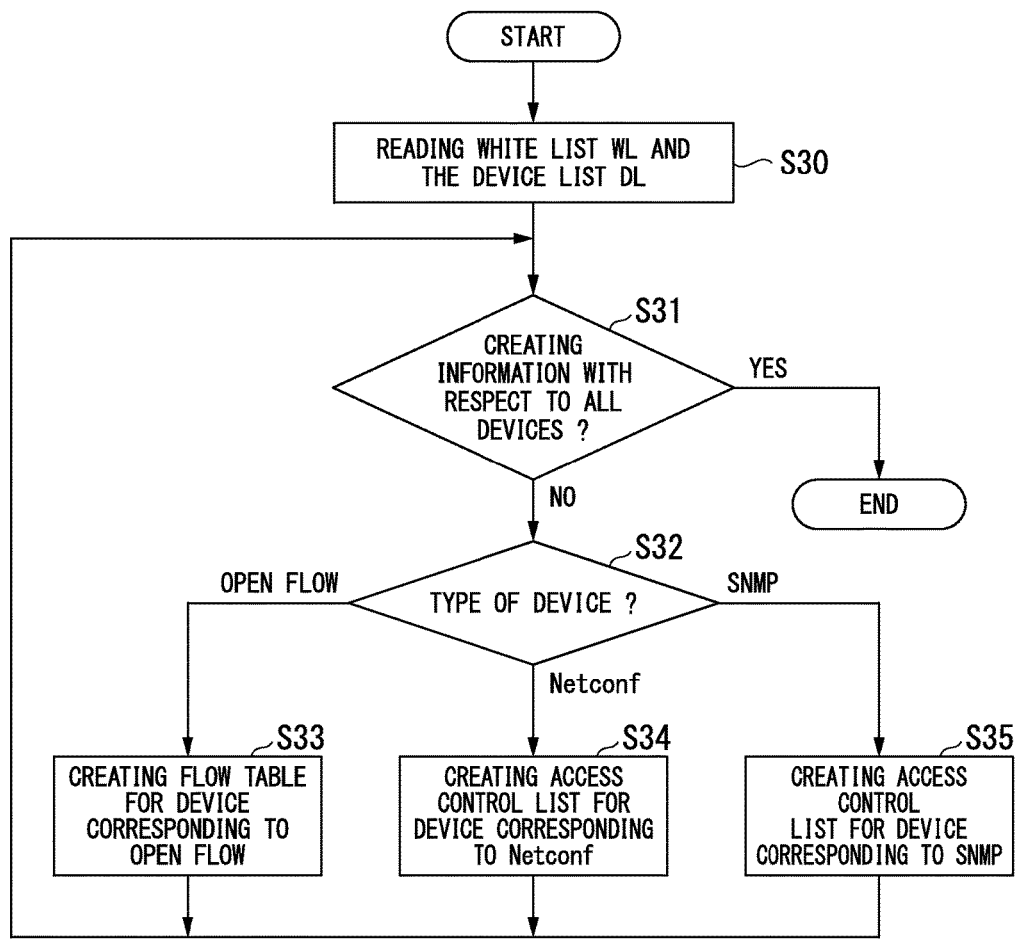
FIG. 7 is a drawing illustrating processes of creating the flow table and the access control list executed by the converter.

FIG. 7 is a drawing illustrating a processing of creating the flow table and the access control list executed by the converter. The converter 41 reads the white list WL and the device list DL out of the memory (step S30). Next, the converter 41 determines whether or not the flow table and the access control list are created with respect to all of the devices (all of the OFS and the switches) (step S31). If the flow table and the access control list are created with respect to all of the devices (all of the OFS and the switches), the converter 41 ends the processing of the flowchart.

On the other hand, if the flow table and the access control list are not created with respect to all of the devices (all of the OFS and the switches), the converter 41 determines a type of a device of which flow table or the access control list is not created (step S32). If the type of the device corresponds to the Open Flow, the converter 41 creates the flow table for a device corresponding to the Open Flow (step S33). If the type of the device corresponds to the Netconf, the converter 41 creates the access control list for a device corresponding to the Netconf (step S34). If the type of the device corresponds to the SNMP, the converter 41 creates the access control list for a device corresponding to the SNMP (step S35). The converter 41 repeats the steps S31 to S35 until the flow table and the access control list are created with respect to all of the devices.

The communicator 42 corresponds to a protocol for the Open Flow. The communicator 42 sets the tentative flow table TB0 created by the converter 41 to the OFS 31 by communicating with the OFS 31. The communicator 43 corresponds to a protocol for the Netconf. The communicator 43 sets the access control list created by the converter 41 to the switch 32 by communicating with the switch 32 in conformity with the Netconf. The communicator 44 corresponds to a protocol for the SNMP. The communicator 44 sets the access control list created by the converter 41 to the switch 33 by communicating with the switch 33 in conformity with the SNMP. In FIG. 6, so as to understand easily, although the communicators 42 to 44 corresponding to the protocols are illustrated separately, these communicators 42 to 44 may be integrated.

In the data transferring system 2 having the configuration, first, the white list WL and the device list DL are created by the network manager. Next, when the network manager instructs, the converter 41 reads the white list WL and the device list DL out of the memory, and the converter 41 generates the flow table suitable for the OFS 31 and the access control lists suitable for the switches 32 and 33 respectively. Thereafter, the communicator 42 communicates with the OFS 31, and the flow table created by the converter 41 is set to the OFS 31. On the other hand, the communicators 43 and 44 communicate with the switches 32 and 33 respectively, the access control lists created by the converter 41 are set to the switches 32 and 33 respectively.

As described above, in the present embodiment, the flow table suitable for the OFS 31 and the access control lists suitable for the switches 32 and 33 are automatically created in accordance with the white list WL and the device list DL. Thereby, even if the OFS 31 which is in conformity with the specification of the Open Flow and switches 32 and 33 which are not in conformity with the specification of the Open Flow are mixed, all the network manager have to do is manage the white list WL and the device list DL, and the management is not to be complicated.

In the white list WL managed by the network manager, the abstract contents such as an address of a transmission source and an address of a transmission destination, which do not depend on the specific configuration of the network, are specified. Thereby, as with the first embodiment, even if the network manager does not preliminarily understand the specific configuration of the network, a strict transferring control based on the white list can be performed timely.

Third Embodiment

Figure 8:
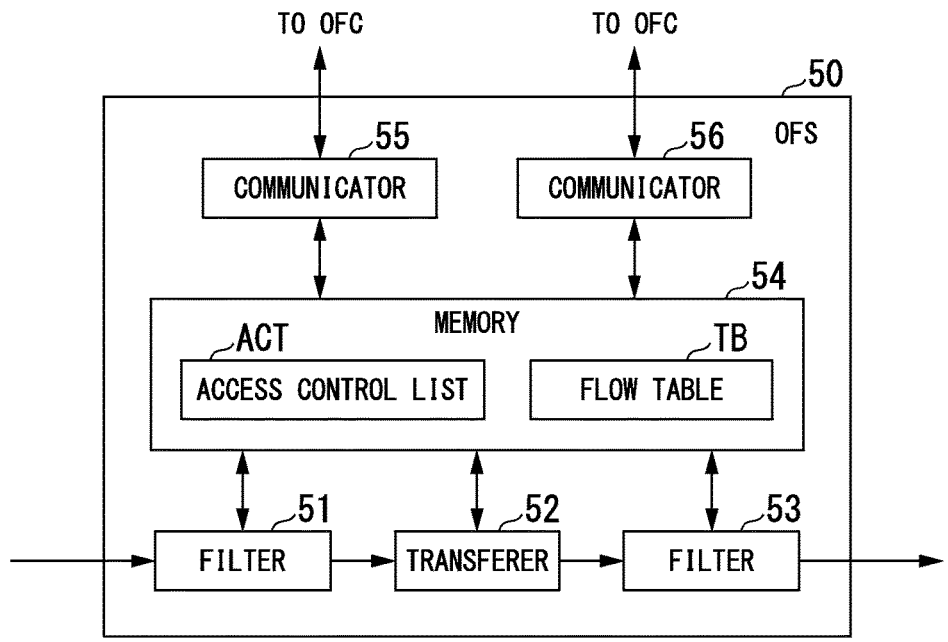
FIG. 8 is a block diagram illustrating a main configuration of the data transferring system in a third embodiment.

FIG. 8 is a block diagram illustrating a main configuration of the data transferring system in a third embodiment. The OFS 50, which is used by the data transferring system in the present embodiment, can perform a data transferring processing in accordance with a flow table TB and a data filtering processing in accordance with an access control list ACL (so-called "hybrid-type"). In the data transferring system of the present embodiment, as with the OFC 40 shown in FIG. 6, an OFC can create the flow table TB and the access control list ACL in accordance with the white list WL and so on.

As shown in FIG. 8, the OFS 50 has a filter 51, a transferer 52, a filter 53, a memory 54, a communicator 55, and a communicator 56. The Filter 51 is disposed in a pre-stage of the transferer 52. The filter 51 performs the data filtering processing with respect to data, which is to be input to the transferer 52, with reference to the access control list ACL stored in the memory 54. The transferer 52 performs the data transferring processing via the filter 51 with reference to the flow table TB stored in the memory 54. The Filter 51 is disposed in a post-stage of the transferer 52. The filter 53 performs the data filtering processing with respect to data, which is output from the transferer 52, with reference to the access control list ACL stored in the memory 54. Any one of the filters 51 and 53 may be omitted.

The memory 54 stores the access control list ACL referred by the filters 51 and 53 and the flow table TB referred by the transferer 52. The access control list ACL stored in the memory 54 is the same as the access control list suitable for the switch 32 in the second embodiment, and the flow table TB is the same as the flow table suitable for the OFS 31 in the second embodiment (referring to FIG. 6).

The communicator 55 corresponds to a protocol for the Open Flow. The communicator 55 stores the flow table TB (the tentative flow table shown in FIG. 2), which is created by the OFC (not shown), in the memory 54 by communicating with the OFC. The communicator 56 corresponds to a protocol for the Netconf and the SNMP. The communicator 56 stores the access control list ACL, which is created by the OFC (not shown), in the memory 54 by communicating with the OFC. As with the second embodiment, these communicators 55 and 56 may be integrated.

In the present embodiment, as with the second embodiment, first, the white list WL and the device list DL are created by the network manager. When the network manager instructs to the OFC (not shown), the flow table TB and the access control list ACL are created respectively in accordance with the white list WL and so on. Thereafter, the communicator 42 communicates with the OFS 31, and the flow table created by the converter 41 is set to the OFS 31. On the other hand, the communicators 43 and 44 communicate with the switches 32 and 33 respectively, the access control lists created by the converter 41 are set to the switches 32 and 33 respectively. Next, the communicators 55 and 56 of the OFS 50 communicate with the OFC (not shown), the flow table TB and the access control list ACL created by the OFC (not shown) are stored in the memory 54 in the OFS 50. Thereafter, the filters 51 and 53 perform the data filtering processing with reference to the access control list ACL stored in the memory 54. On the other hand, the transferer 52 performs the data transferring processing with reference to the flow table TB stored in the memory 54.

As described above, in the present embodiment, the transferer 52 in the OFS 50 performs the transferring processing in accordance with the flow table TB which is created in accordance with the white list WL and so on. Also, the filters 51 and 53 in the OFS 50 perform the filtering processing in accordance with the access control list ACL which is created in accordance with the white list WL and so on. Thereby, even if the hybrid-type OFS 50 is connected to the network, all the network manager have to do is manage the white list WL and the device list DL, and the management is not to be complicated. The OFS 50 can perform an access control by using any one of the filter 51, the transferer 52, and the filter 53.

In the present embodiment, in the white list WL managed by the network manager, the abstract contents such as an address of a transmission source and an address of a transmission destination, which do not depend on the specific configuration of the network, are specified. Thereby, as with the second embodiment, even if the network manager does not preliminarily understand the specific configuration of the network, a strict transferring control based on the white list can be performed timely.

MODIFIED EXAMPLE

First Modified Example

Generally, a flow table which is in conformity with the Open Flow has a lifetime. The OFC 20 and the OFC 40 may set a finite lifetime, and may set an infinite lifetime, to the tentative flow table TB0 and the flow tables TB1 and TB2.

In a case that the OFC 20 and the OFC 40 set the finite lifetime, OFC 20 and the OFC 40 automatically delete the flow table when the lifetime expires. Therefore, for example, because it can be prevented that the network manager forgets deleting the flow table of which life time expires, security can be improved. On the other hand, in a case that the OFC 20 and the OFC 40 set the infinite lifetime, the flow table is not deleted without an instruction for deleting from the network manager. Therefore, because it is prevented that the flow table is deleted without the network manager's acknowledgement, the flow table can be explicitly managed in accordance with intention of the network manager.

Second Modified Example

In the first to third embodiments, the OFC 20 and the OFC 40 may be provided with a timer, and a processing for setting the tentative flow table TB0 to the OFS11, 12, 31 and 50 (step S10 shown in FIG. 4) or a processing for deleting the set tentative flow table TB0 may be automatically performed in accordance with a predetermined schedule. Thereby, because a communication via the network can be performed in only a predetermined period or a communication via the network can be temporarily performed, safety can be improved.

Third Modified Example

Figure 9:
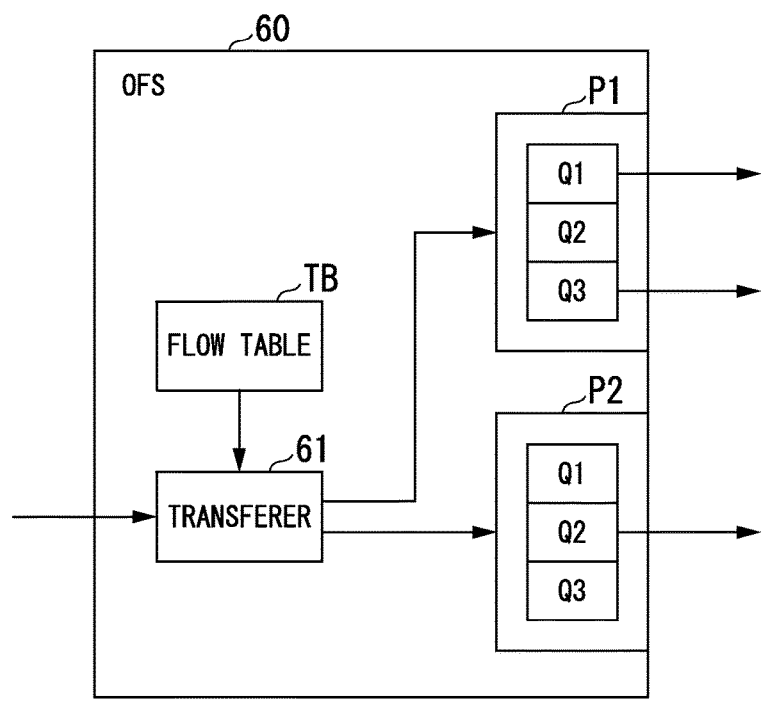
FIG. 9 is a drawing illustrating a modified example of the OFS used in the data transferring system.

FIG. 9 is a drawing illustrating a modified example of the OFS used in the data transferring system. As shown in FIG. 9, the OFS 60 has a transferer 61 and physical ports P1 and P2. The OFS 60 performs a data transferring processing with reference to a flow table stored in a memory (not shown). The transferer 61 is the same as the transferer 52 shown in FIG. 8. Although the OFS 60 having the two physical ports P1 and P2 is shown in FIG. 9, a number of the physical ports provided in the OFS 60 is arbitrary.

Queues Q1 to Q3 are provided in the physical ports P1 and P2 in the OFS 60. Bandwidths, which are different from each other, can be allocated to the queues Q1 to Q3 respectively. So as to allocate a queue to a particular flow, it is necessary to specify a physical port to which a flow is output, and specify a queue, which is to be allocated, out of queues provided in the specified physical port.

In the embodiments described above, as described by using FIG. 4, if the route information representing a route of the network is obtained, the tentative flow table TB0 (shown in FIG. 2), in which any physical port is not specified, is updated to the flow tables TB1 and TB2 (shown in FIG. 3) in which physical ports are specified. Therefore, in the present modified embodiment, if bandwidth for each flow, to which bandwidth is to be allocated, is specified in the white list WL of the OFC, when the route information representing the route of the network is obtained and the tentative flow table TB0 is updated, a physical port is specified and a queue is selected.

In a case that a setting for enabling a flow and bandwidth to be used is performed, it is desirable to verify whether or not the setting conforms to a policy of a network operation. For example, in a case that the processing of the step S10 shown in FIG. 4 (the processing in which the OFC 20 sets the tentative flow table TB0 to the OFS 11 and the OFS 12) is performed, it is desirable that the network manager verify whether or not a user using the tentative flow table TO has a use authority. Therefore, in a case that the processing of the step S10 shown in FIG. 4 is performed, it is desirable to inquire a server which has AAA functions (Authentication, Authorization, and Accounting). Thereby, authentication of a setting person and a device, management of authority, recording of charging information, and so on can be performed.

The OFC 20 and the OFC 40 in the embodiments have a computer system therein. The procedures of the processing of the OFC 20 and the OFC 40 are stored in a form of one or more programs in a non-transitory computer readable storage medium. The computer reads and executes the one or more programs so that the various processing can be performed. The non-transitory computer readable storage medium is such as a magnetic disc, a magnetic optical disc, a CD-ROM, a DVD-ROM, and a semiconductor memory. Also, the one or more programs may be distributed to the computer via a communication line, and the computer which receives the one or more programs may execute the one or more programs.

Although a data transferring system, a data transferring method, a controller, a controlling method, and a non-transitory computer readable storage medium according to embodiments of the present invention have been described above, the present invention is not restricted to the above-described embodiments, and can be freely modified within the scope thereof. For example, the foregoing descriptions of the first embodiment have been examples in which the route information representing the route between the hosts H1 and H2 is obtained by using Arp, on the assumption that the network N1 shown in FIG. 1 is a network in which an IPv4 protocol is used. However, in a case that the network N2 is a network in which an IPv6 protocol is used, the present invention can be also applied. In the network, the route information representing the route between the hosts H1 and H2 can be obtained by using a Neighbor Discovery protocol. In the embodiments described above, although the device which is in conformity with the Open Flow has been described, the present invention can be used in a case of another device implementing an SDN (Software-Defined Network) having a restriction which is the same as that of the Open Flow.

As used herein, the following directional terms "forward, rearward, above, downward, right, left, vertical, horizontal, below, transverse, row and column" as well as any other similar directional terms refer to those directions of an apparatus equipped with the present invention. Accordingly, these terms, as utilized to describe the present invention should be interpreted relative to an apparatus equipped with the present invention.

The term "configured" is used to describe a component, unit or part of a device includes hardware and/or software that is constructed and/or programmed to carry out the desired function.

Moreover, terms that are expressed as "means-plus function" in the claims should include any structure that can be utilized to carry out the function of that part of the present invention.

The term "unit" is used to describe a component, unit or part of a hardware and/or software that is constructed and/or programmed to carry out the desired function. Typical examples of the hardware may include, but are not limited to, a device and a circuit.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A data transferring system comprising:
a controller which comprises a setter, an obtainer, and an updater; and
a switch configured to transfer data from a transmission source to a transmission destination with reference to a table in which a first information and a second information are associated, the first information representing a condition for received data, and the second information representing a processing which is performed when the condition is satisfied,
wherein the setter is configured to set a tentative table to the switch, the tentative table storing the second information for outputting data, which is matched with the condition represented by the first information, to the controller,
wherein the obtainer is configured to obtain a route information representing a route between the transmission source and the transmission destination,
wherein the updater is configured to update the tentative table to form a table in which an outputting destination of data, which is matched with the condition represented by the first information, is changed in accordance with the route information,
wherein the controller and the switch are established in a hierarchy of level 3 specified by the international standard IEC/ISO 62264, in a process control system in a plant; and
wherein the controller further comprises a generator configured to generate the tentative table which is to be set to the switch and an access control list which is to be set to a non-conforming switch, the switch being in conformity with the Open Flow specification, and the non-conforming switch being not in conformity with the Open Flow specification.

2. The data transferring system according to claim 1, wherein
the updater is configured to update the tentative table at a timing when the obtainer obtains the route information, or a timing when the transmission source transmits data to the transmission destination for the first time after the obtainer obtains the route information.

3. The data transferring system according to claim 1, wherein
the setter is configured to set a priority to the table which is set to the switch, and
the updater is configured to update the tentative table to the table which is higher in the priority than the tentative table.

4. The data transferring system according to claim 1, wherein
the setter is configured to set a finite lifetime or an infinite lifetime to the table or the tentative table which are used in the switch.

5. The data transferring system according to claim 1, wherein
the setter is configured to perform at least one of a setting of the tentative table and a deletion of the tentative table with respect to the switch in accordance with a predetermined schedule.

6. The data transferring system according to claim 1, wherein
the switch comprises a plurality of queues of which bandwidths are different from each other with respect to each of a plurality of ports in the switch, and
the switch selects the queue with respect to each port when the tentative table is updated.

7. The data transferring system according to claim 1, wherein
the switch and the controller are in conformity with an Open Flow specification, and
the controller further comprises:
a condition list that specifies a condition of a data transferring control from the transmission source to the transmission destination.

8. A controller comprising:
a setter configured to set a first table to a switch which has a plurality of ports to transfer data, the first table including a condition and a processing being associated with the condition, the condition including information of a transmission source and information of a transmission destination, and the processing representing information of one of the ports to which the controller is connected,
an obtainer configured to obtain a route information representing a route between the transmission source and the transmission destination, and
an updater configured to update the first table to a second table in accordance with the route information,
wherein the controller and the switch are established in a hierarchy of level 3 specified by the international standard IEC/ISO 62264, in a process control system in a plant,
wherein the updater is configured to update the first table at a timing when the obtainer obtains the route information, or a timing when the transmission source transmits data to the transmission destination for the first time after the obtainer obtains the route information, and
wherein the controller further comprises a generator configured to generate the first table which is to be set to the switch and an access control list which is to be set to a non-conforming switch, the switch being in conformity with an Open Flow specification, and the non-conforming switch being not in conformity with the Open Flow specification.

9. The controller according to claim 8, wherein
the updater is configured to update the first table to the second table by changing the information of the port represented by the processing in accordance with the route information.

10. The controller according to claim 8, wherein
the setter is configured to set a priority to the first table and the second table which are set to the switch, and
the updater updates the first table to the second table which is higher in the priority than the first table.

11. The controller according to claim 8, wherein
the setter is configured to set a finite lifetime or an infinite lifetime to at least one of the first table and the second table which are used in the switch.

12. The controller according to claim 8, wherein
the setter is configured to set the first table and delete the first table in accordance with a predetermined schedule.

* * * * *